July 8, 1947. F. J. HURN 2,423,597
INSTRUMENT PANEL FOR MOTOR CARS AND OTHER VEHICLES
Filed April 17, 1943 3 Sheets-Sheet 1

INVENTOR
F. J. Hurn
By Watson, Cole, Grindle & Watson
ATTYS

July 8, 1947.　　　　　F. J. HURN　　　　　2,423,597
INSTRUMENT PANEL FOR MOTOR CARS AND OTHER VEHICLES
Filed April 17, 1943　　　3 Sheets-Sheet 2

INVENTOR
F. J. Hurn
By Watson, Cole, Grindle &
Watson
ATTYS

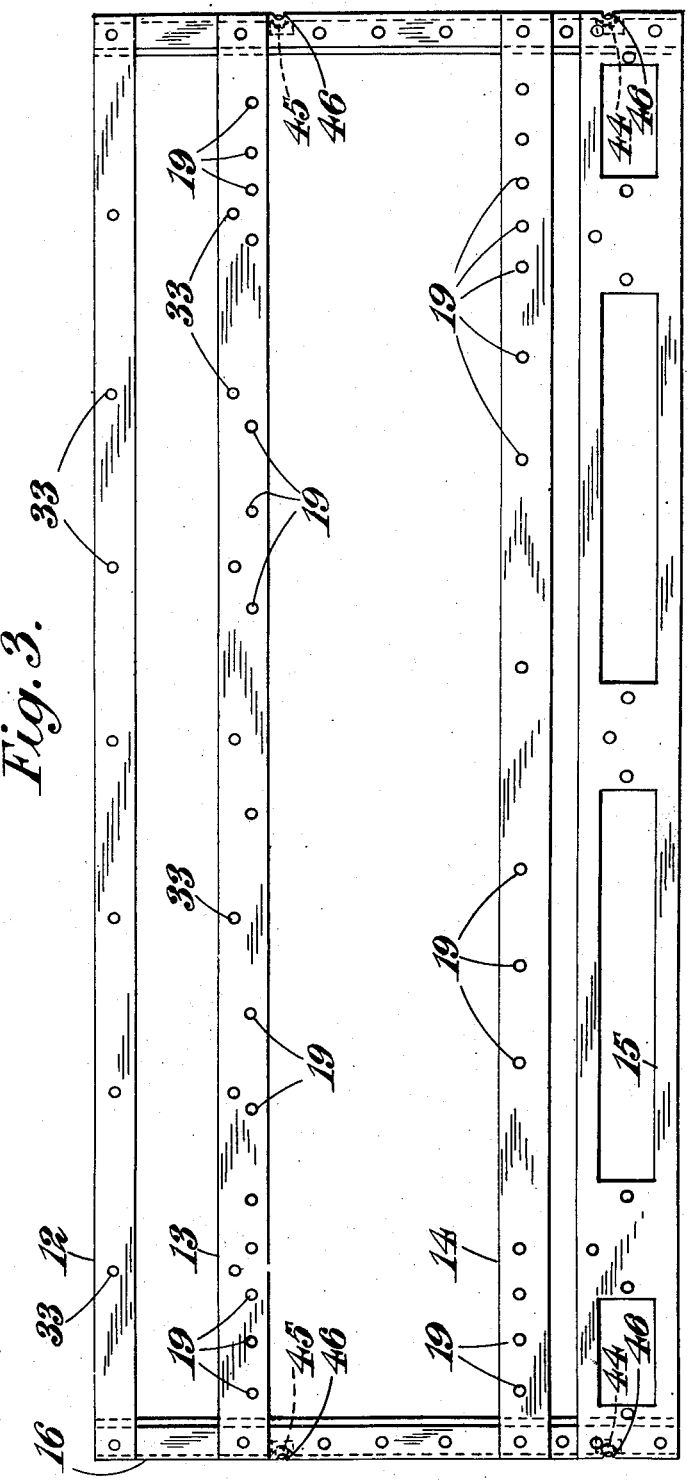

Patented July 8, 1947

2,423,597

UNITED STATES PATENT OFFICE 2,423,597

INSTRUMENT PANEL FOR MOTOR CARS AND OTHER VEHICLES

Francis James Hurn, Cricklewood, London, England, assignor to S. Smith & Sons (England) Limited, a British company Application April 17, 1943, Serial No. 483,530
In Great Britain February 9, 1942

6 Claims. (Cl. 180—90)

This invention relates to instrument panels for motor cars and other vehicles. Such panels usually comprise a part of the facia board in which are formed a number of holes through which the instruments are passed so that a flange extending radially from the instrument case at the front thereof engages the front of the board adjacent the periphery of the hole. The term "instruments" used throughout the specification is intended to include in addition to the ordinary indicating instruments, such articles as switches, cigarette lighters, wireless control, choke control, etc. The aforesaid flange is held against the board and each instrument is secured by means of a strap attached to its back and engaging the back of the board. The present invention is directed to overcoming a number of disadvantages connected with the above and other usual methods of mounting instruments. Firstly, the connections to the instruments, which may comprise pipes, electric leads or flexible drives, have usually been at the back of the board and therefore very inaccessible. Secondly, since motor vehicle manufacturers usually require instruments and other panel fittings of distinctive appearance for their motor vehicles it is necessary to supply a different set of instruments for each manufacturer and to manufacture a large range of instruments and panels for their support. Thirdly, a manufacturer may require a greater number of instruments or different layout of instruments on his larger models than on his smaller models and this necessitates supplying more than one type of layout assemblage to the same manufacturer. The present invention is directed towards overcoming these disadvantages.

According to this invention an instrument panel for a motor car or other vehicle comprises an instrument support having means for mounting instruments therein and a mask covering the front of the support and provided with openings through which the instruments may be viewed and adapted to obscure one or more of unwanted mounting positions on the support in which other fittings may be mounted in other models. It will be appreciated that this arrangement enables a large number of different layouts to be effected on a standard support, it only being necessary to provide an appropriate mask. Furthermore, by removing the mask the various connections are readily accessible.

A feature of the invention consists in providing the support with means for securing said instruments in any of a number of preselected positions; for example, the locating and securing means are arranged to provide more locating and securing positions on it than are required for the maximum number of instruments likely to be employed in any one vehicle of a range of vehicles and which mask is selected to provide a number of openings corresponding to the number of instruments required for a particular vehicle and in a position to register with a selected layout of these instruments while obscuring the unused positions.

The locating and securing means may provide overlapping instrument positions whereby a symmetrical layout of instruments may be retained by selecting the appropriate positions.

According to one feature of the present invention, the instrument support is provided with means for enabling an instrument to be mounted in either of two positions and means for enabling a second instrument to be mounted in a third position and a mask having openings through which instruments and other fittings on the support may be viewed is arranged in front of the support.

If no instrument is mounted in the third position the mask may be arranged to obscure this position.

The instrument support may have an opening for the reception of an instrument in which the instrument can move laterally and means for securing the instrument in the opening in at least two positions. An instrument for use in such a support may have diametrically opposite radially extending lugs with holes for mounting the instrument by means of screws passing through the lugs and engaging the support. Furthermore, electrical instruments and/or other fittings mounted on the front of the support may have electrical leads brought out to terminals also on the front of the support, whereby the fittings or connections may readily be removed from the front of the support.

The mask preferably has backwardly directed flanges along the bottom edge and two sides thereof and means for attaching the mask to the facia board. This enables the mask to be mounted with its face above the level of the surrounding facia board. The side flanges are preferably tapered as viewed in side elevation and taper upwards. This enables the face of the mask to be tilted upwards relatively to the surrounding facia board. The bottom flange may be slotted to allow the passage of instrument controls, such as a clock winder or trip reset.

Another feature of this invention comprises the method of modifying the instrument panel which consists in removing the mask, adding or removing an instrument to or from the support with or without adjusting the position of the other instruments on the support and covering the panel with another mask having openings to register with the instruments in the new layout, which new layout may retain the spaced and general symmetrical appearance of the original layout.

The following is a description of one form of instrument mounting for a motor vehicle, reference being made to the accompanying drawing, in which—

Figure 3 is a face view of the mounting with the instruments removed.

Figure 1:
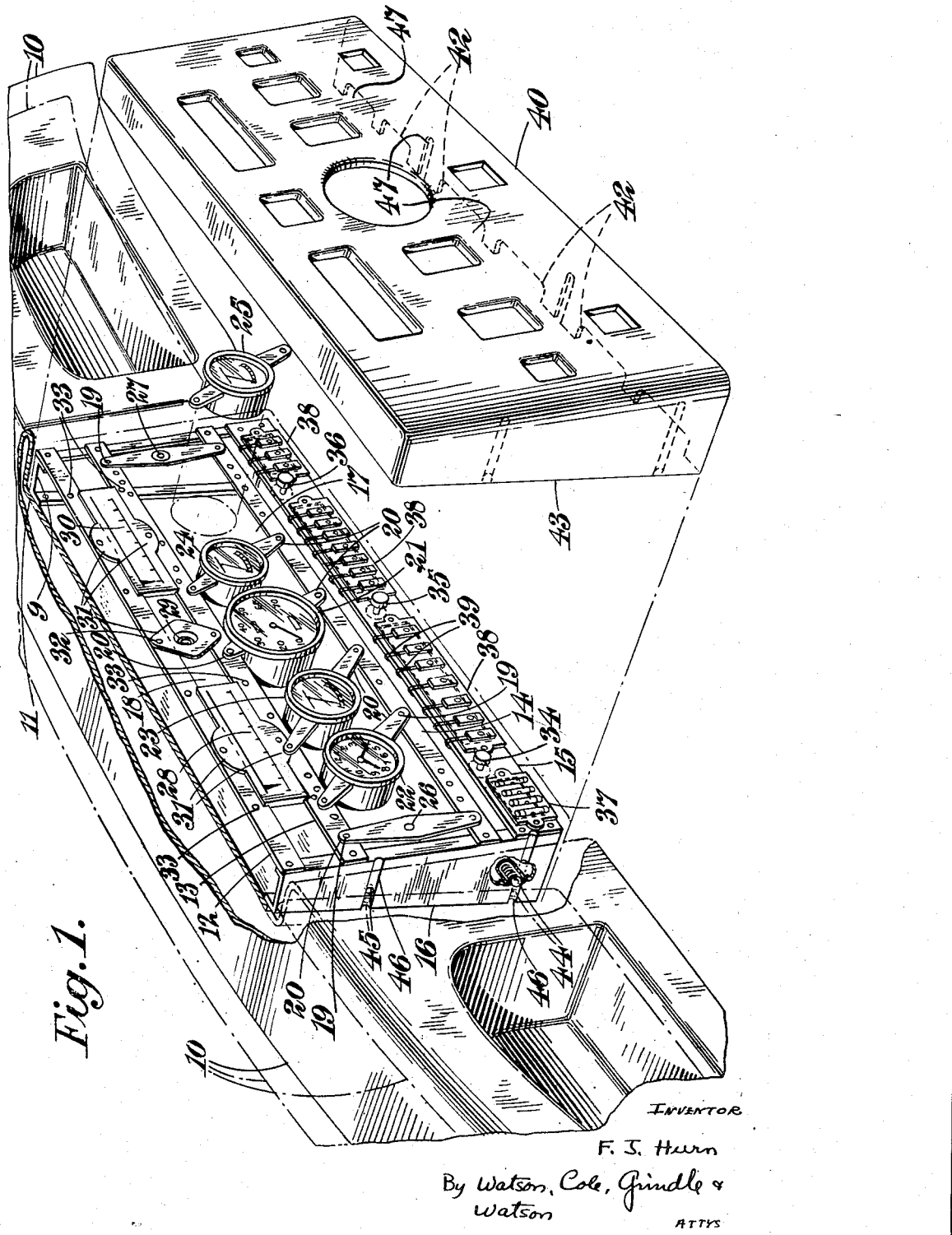
Figure 1 is a perspective view showing the mounting in position on the facia board with the mask and one of the instruments removed and displaced therefrom.

The facia board of a motor vehicle is in the form of a steel pressing 10 with a rectangular recess 11 for the reception of the support for the instruments. The support is provided with side flanges 9 which are bolted to the bottom of the recess and which are spaced away from the sides of the recess.

The instruments are carried on a support built up from sheet metal and comprising a number of metal strips 12, 13, 14 and 15 secured between angle side pieces 16. A comparatively wide gap 17 is provided between the strips 13, 14, in which gap the main assemblage of instruments is located, while a narrower gap 18 is formed between the strips 12, 13 for accommodating other units, as set out below. A number of screw-threaded holes 19 are tapped in the strips 13, 14, and these constitute the means for securing and locating the instruments. The casing of each instrument is provided with lugs 20 and the instruments are mounted by means of screws passing through the lugs into the tapped holes, the instrument cases lying within the gap 17. The speedometer 21 is centrally disposed. The other instruments are, reading from left to right, clock 22, oil gauge 23, fuel gauge 24 and radiator thermometer 25. On the extreme left of the slot is mounted the ignition warning lamp 26 and on the extreme right, the instrument lighting switch 27. Each instrument is provided with its own individual lamp for lighting purposes and the switch is of the rheostat type for effecting dimming. Located in the gap 18 are an indicator 28 for a car heater, a cigar lighter 29 and an indicator 30 for a radio set. All these instruments are provided with lugs or flanges 31 which overlie the strips 12 and 13 and are drilled to receive securing screws 32 which engage appropriate threaded holes in a set of holes 33 provided in said strip.

A number of openings are also provided in the bottom strip 15 and in these are fitted a choke control 34, an ignition and lighting switch 35, a starter switch 36 and a fuse board 37 and also three terminal boards 38. All electrical leads 39 from the instruments and other fittings are brought out to terminals on the terminal boards.

Over the front of this plate is arranged a mask 40 having appropriate openings 41 for the above instruments and control switches. All other parts of the support are obscured from view. The face of this mask is suitably decorated to blend with the rest of the facia board.

In the arrangement illustrated in the drawings the instruments and other fittings lie flush with the surrounding facia board. The instruments and other fittings may however be arranged to stand proud of the rest of the facia board and so may also the front face of the mask or the surrounding facia board may be set back as shown in the drawings in broken lines; consequently, to avoid any gaps at the bottom edge or sides of the mask in such an arrangement the mask is provided along its bottom edge with a backwardly extending flange 42 and along each side with a flange 43 which tapers in an upward direction. These flanges contact the facia board within the recess and the mask is secured in position by spring-loaded ball fastenings 44 carried by the inner faces of the flanges and which engage recesses 45 in grooves 46 formed on the angle-pieces 16 of the support. The bottom flange 42 of the mask is slotted at 47 to permit the various electrical and other conduits to pass through it on their way to the terminal boards and instruments. The various instruments are provided with individual illumination which is shrouded so as to prevent passage of light through the slotted flange.

Figure 2:
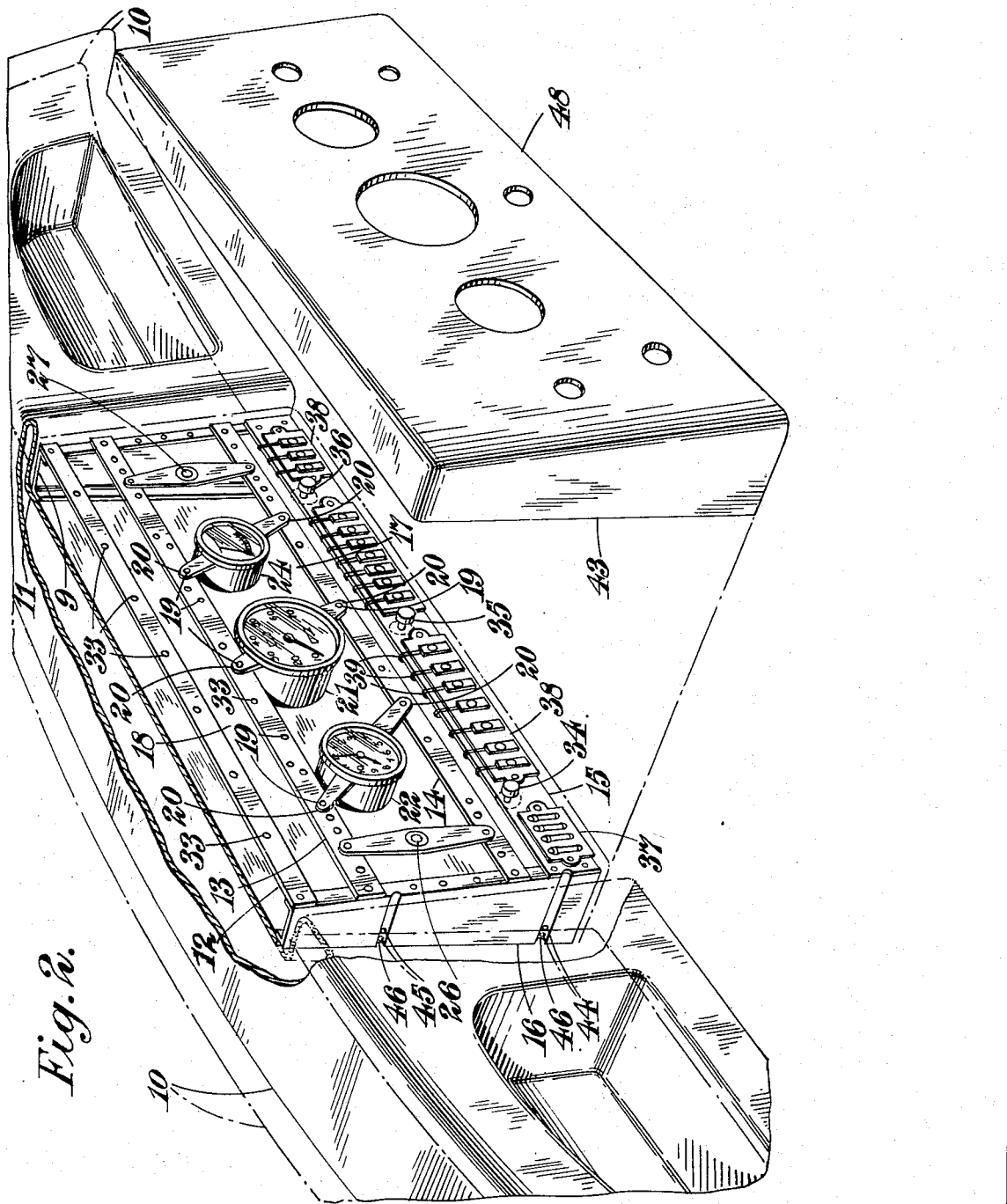
Figure 2 is a similar view to Figure 1 showing a different assemblage of instruments on the same mounting and a different appropriate mask.

The arrangement described above is that for a high-priced car. For a low-priced car the two indicators, the clock and the thermometer are not required. The symmetrical spaced appearance of the instruments on the mask is retained in the manner shown in Figure 2 by moving the oil gauge to a position intermediate those of the original clock and oil gauge and by moving the fuel gauge to a position intermediate those of the original thermometer and fuel gauge. Certain of the intermediate holes 20 are used for this purpose. A different mask 48 is now used having openings suitably spaced for the new arrangement of the instruments on the support; no openings of course are provided for the fittings which have been removed.

In a modification of the above construction the holes 20 are replaced by threaded studs passing through the holes in the lugs and engaged by nuts or, preferably, by spring wire clips of the kind used on some sparking plug terminals to facilitate rapid fastening and removal.

It will be seen that by adopting a construction in accordance with the invention it is only necessary to manufacture one standard type of support and one standard set of instruments, thereby simplifying the manufacture of components for a large range of motor vehicles. Masks may then be provided to suit all vehicle manufacturers and all models. Furthermore, the owner of a low-priced motor vehicle may at any time add to his range of components by purchasing a suitable mask.

I claim:

1. An instrument panel for a motor vehicle comprising an instrument support having an elongated opening therein for the reception of a number of instruments side by side, the width of said opening at all points being at least as large as the corresponding width of any of the inserted instruments to permit adjusting movement of said instruments in the plane of said opening without removal from said opening, radially extending portions on each said instrument, a plurality of securing points formed on said support along the margins of said opening, said points being more in number than the instrument portions provided, said portions overlying the margins of said opening so as to be applied from the front of said panel, fastening means whereby said portions may be removably attached to selected ones of said securing points according to the adjusted position of said instruments, a mask, means for securing the mask over said support, openings in said mask corresponding to the number of instruments required and in a position to register with the selected lay-out of those instruments, an electrical terminal board secured to the front of said support, and terminals upon the forward face of said board whereby all electrical leads are secured from the front of the panel making accesses to the rear thereof unnecessary.

2. An instrument panel for a motor car comprising an instrument support having an elongated opening therein extending horizontally across the width of the support for the reception of a variable but definitely limited number of instruments side by side, the width of the opening itself throughout the length thereof being greater at all points than the largest size of instrument of the set of instruments supported to permit adjusting movement of said instruments in the plane of said opening without removal therefrom, radially extending portions on each of said instruments, said portions overlying the margins of the opening so as to be applied from the front of the panel, a plurality of tapped holes formed on said support along the margins of said opening, said holes being sufficient in number to accommodate the predetermined maximum of instruments to be used in the various layouts, securing elements for said instruments comprising screws passing through openings in said radially extending portions of the instruments and selected ones of said holes according to the adjusted positions of the instruments, the unused tapped holes being so disposed as to provide alternative mounting positions for certain of the instruments, overlapping the first positions of adjustment, an interchangeable mask selected from an assortment of masks having different arrangements of openings therein contemplating variable arrangements and selections of instruments on the panel, spring pressed means for quick-detachably snapping the selected mask in position on the panel over said support, and openings in said mask corresponding to the number of instruments currently required and disposed in positions to register with the selected layout of those instruments.

3. An instrument panel for a motor car comprising an instrument support having an elongated opening therein extending horizontally across the width of the support for the reception of a variable but definitely limited number of instruments side by side, the width of the opening itself throughout the length thereof being greater at all points than the largest size of instrument of the set of instruments supported to permit adjusting movement of said instruments in the plane of said opening without removal therefrom, radially extending portions on each of said instruments, said portions overlying the margins of the opening so as to be applied from the front of the panel, a plurality of tapped holes formed on said support along the margins of said opening, said holes being sufficient in number to accommodate the predetermined maximum of instruments to be used in the various layouts, securing elements for said instruments comprising screws passing through openings in said radially extending portions of the instruments and selected ones of said holes according to the adjusted positions of the instruments, an interchangeable mask selected from an assortment of masks having different arrangements of openings therein contemplating variable arrangements and selections of instruments on the panel, spring pressed means for quick-detachably snapping the selected mask in position on the panel over said support, and openings in said mask corresponding to the number of instruments currently required and disposed in positions to register with the selected layout of those instruments, said mask being provided with flanges extending rearwardly from its face, the bottom flange being wider than the top one and the side flanges tapering accordingly, whereby the face is given a desirable inclination for observation of the instruments, said bottom flange being provided with slots for the accommodation of wiring leading to the instruments.

4. An instrument panel comprising an instrument support having an elongated opening therein for the reception of a number of instruments side by side, a plurality of selectable and optionally usable instrument positions within said opening, a plurality of instruments, portions of which are adapted to overlie and be secured to the margins of the opening so that they are adapted to be applied from the front of the support and to be adjustable within said opening to and from the selected positions, securing means for said instruments, an electrical terminal board carried by said support and also adapted structurally to be installed from the front, and electrical connections and terminals on the front of the board, leads extending from said connections to said instruments, all whereby the electrical connections and terminals are accessible from the front of the instrument panel, a mask having openings therein corresponding to the number and position of the instruments in the selected lay-out, and means for detachably securing said mask over the support.

5. An instrument panel for a motor vehicle comprising an instrument support having a surface facing outwardly from the panel, a plurality of selectable and optionally usable instrument positions on said surface, a plurality of instruments selectably applicable in number and location to said positions on the support, a mask detachably applicable to said support, said mask having openings therein corresponding in number and location to the number of positions of the instruments in the selected lay-out, an electrical terminal board applied to said surface of the support, a plurality of electrical terminals on the front of said board, and means for electrically connecting said terminals and said instruments, all whereby the terminals are readily accessible from the front of the instrument panel once the mask has been removed.

6. An instrument panel for a motor vehicle comprising an instrument support having a surface facing outwardly from the panel, a plurality of selectable and optionally usable instrument positions on said surface, a plurality of instruments selectably applicable in number and location to said positions on the support, an interchangeable mask detachably applicable to said support, said mask having openings therein corresponding in number and location to the number of positions of the instruments in the selected lay-out, said mask selected from an assortment of masks having different selections of openings therein contemplating variable arrangements and selections of the instruments on the support, an electrical terminal board applied to said surface of the support, a plurality of electrical terminals on the front of said board, and means for electrically connecting said terminals and said instruments, all whereby the terminals are readily accessible from the front of the instrument panel once the mask has been removed.

FRANCIS JAMES HURN.

REFERENCES CITED

The following references are of record in the file of this patent:

UNITED STATES PATENTS

| Number | Name | Date |
|---|---|---|
| 1,840,494 | Eshbaugh | Jan. 12, 1932 |
| 1,835,456 | Bernard et al. | Dec. 8, 1931 |
| 1,897,966 | Zubaty et al. | Feb. 14, 1933 |
| 1,761,955 | Zubaty | June 3, 1930 |
| 1,467,636 | Hammond | Sept. 11, 1923 |
| 1,722,565 | Dunn | July 30, 1929 |
| 1,787,684 | Jacobi | Jan. 6, 1931 |
| 1,823,868 | Zubaty | Sept. 15, 1931 |
| 1,782,405 | Boyce | Nov. 25, 1930 |
| 1,743,401 | Schlaich | Jan. 14, 1930 |
| 2,261,029 | Hopkins | Oct. 28, 1941 |
| 1,288,024 | Kendig | Dec. 17, 1918 |
| 1,790,031 | Vaughn | Jan. 27, 1931 |

FOREIGN PATENTS

| Number | Country | Date |
|---|---|---|
| 257,446 | Great Britain | Sept. 2, 1926 |